United States Patent [19]

Desodt et al.

[11] Patent Number: 5,287,114
[45] Date of Patent: Feb. 15, 1994

[54] METHOD TO REDUCE FALSE ALARMS IN A RADAR

[75] Inventors: Guy Desodt, Massy; Jean-Pierre Larvor, Chatenay Malabry, both of France

[73] Assignee: Thomson-CSF, Puteaux, France

[21] Appl. No.: 954,889

[22] Filed: Sep. 30, 1992

[30] Foreign Application Priority Data

Oct. 11, 1991 [FR] France ............................ 91 12567

[51] Int. Cl.⁵ .............................................. G01S 13/00
[52] U.S. Cl. .......................................... 342/91; 342/93
[58] Field of Search .................................. 342/91, 93

[56] References Cited

U.S. PATENT DOCUMENTS

| | | | |
|---|---|---|---|
| 4,386,353 | 5/1983 | Bleijerveld et al. | 342/91 |
| 4,503,432 | 3/1985 | Bailey . | |
| 4,586,043 | 4/1986 | Wolf | 342/93 |
| 4,649,394 | 3/1987 | Minker et al. | 342/93 X |
| 4,749,994 | 6/1988 | Taylor, Jr. | 342/93 X |
| 4,837,579 | 6/1989 | Pease et al. | 342/91 X |

OTHER PUBLICATIONS

E. Al-Hussaini, "Performance of th gre-er-of . . . Environments", Jun., 1988 IEE Proc. F. Comm., Radar & Sign. Proc., vol. 135, pp. 193–198.
"Low-Loss Almost Constant False-Alarm Rate Processors", IEEE Trans. on Aerospace and Elec., vol. 15, No. 5, Sep. 1979, pp. 719–723.
H. Rohling, "Robust Algorithms . . . Background Situations", Onzieme Colloque Sur Le Traitement Du Signal et Des Images, Jun. 1987, Nice, France, pp. 123–126.
H. Rohling, "Radar CFAR Thresholding in Clutter and Multiple Target Situations", IEEE Transactions on Aerospace and Electronic Systems vol. AES-19, No. 4, Jul. 1983.
H. Rohling, "Robust Algorithms for Point Target Detection in Different Background Situations", Onzieme Colloque Gretsi-Nice from 1–5 Jun. 1987.
G. Desodt et al, "Medium Range Radar Processing: Experimental Results", International Conference Radar 87, 19–21 Oct. 1987.
Skolnik Radar Handbook 1990, pp. 3.1–3.5 3:46–3.55.

*Primary Examiner*—Mark Hellner
*Attorney, Agent, or Firm*—Metlzer, Lippe, Goldstein, Wolf, Schlissel & Sazer

[57] ABSTRACT

Disclosed is a method for the adjusting of the detection threshold of a radar receiver for a distance zone called a search zone surrounded by distance zones called adjacent zones, fitted out with a module enabling the computation of the mean value as a function of the distance of the ambient noise along an axis starting from the receiver wherein, for each search distance zone, the detection threshold is raised by a zero value when the ambient noise is low and by a value that increases monotonically with the level of the noise measured when the ambient noise is greater than a pre-determined threshold.

13 Claims, 2 Drawing Sheets

METHOD TO REDUCE FALSE ALARMS IN A RADAR

BACKGROUND OF THE INVENTION

1. Field of the Invention

The field of the invention is that of methods designed to reduce the rate of false alarms in a radar receiver, especially when there is sea clutter present.

It is known that a radar receiver comprises a detector constituted by a comparator which compares the level of the received signal with a reference level known as a detection threshold. In principle, a level of signal above this threshold corresponds to the reception of an echo coming from a target.

It is also known that since the level of ambient noise is a random factor, it may happen that a signal containing only noise is strong enough to exceed the detection threshold, thus prompting what is called a false alarm. The known methods used to limit the probability of having a false alarm consist in raising the detection threshold as a function of the noise.

2. Description of the Prior Art

The problem then is to raise the threshold sufficiently so as to avoid a false alarm rate that is higher than a set rate, but not to raise this threshold excessively, in order that the echos may continue to be detected.

In particular, as regards clutter, and more particularly clutter due to the sea for onboard surface radars, it has been sought to make use of the spatially stationary state of these noises. In this type of application, it is considered that, in a given zone, defined by its elevation angle, the noise of the clutter is fairly constant. The mean value chosen may be either the maximum value of the partial mean values according to a pre-set partitioning of the distance zones, or the value according to the Kth greatest sample. According to this method, which is applicable to video signals digitally converted by sampling, it is assumed that the n-k smaller samples contain only noise, and it is these samples that are chosen for the computation of the noise.

It has also been sought to exploit the temporally stationary state in a zone from antenna rotation to antenna rotation. It is considered in this case that, for a given zone, defined by its distance and its elevation angle, the noise can vary only slowly so that its mean may be considered as the mean value recorded on a certain number of antenna rotations.

Whether it is the stationary spatial state or the temporal spatial state that is considered, there are existing variants of implementation. Thus, with regard to the magnitude characterizing the signal, the mean value of which will be computed, we may consider:

the modulus of the signal (its amplitude)
the modulus squared of the signal (its power)
the logarithm of the modulus With regard to the zones, the mean values can be computed on sliding window type zones that overlap one another partially or, on the contrary, on block type zones that exclude one another.

Finally, with regard to the adjusting of the threshold for a given zone, it is possible to take into consideration either the mean value obtained on this zone or the mean value obtained on one or more immediately adjacent zones, excluding the zone under examination.

The prior art methods that have just been described are satisfactory only inasmuch as the clutter actually has a spatially or temporally stationary state. However, measurements made by the applicant show that the assumed stationary state does not exist, especially when there are rough seas.

In rough seas, the echos obtained are not stationary in distance. There are peaks of sea clutter that appear in a distance cell as compared with the neighboring cells. Nor are they more stationary in time, for the peaks do not occur at the same positions from one antenna rotation to another. Consequently, methods of regulating false alarms that are based on temporally or spatially stationary states are not totally efficient.

One of the aims of the present invention is to provide greater efficiency to the regulating of false alarms by raising the detection threshold. It does so by proposing a method to raise this threshold by the precise quantity needed to attain a value above the value of the extreme peaks, especially when the sea is rough. The aim pursued by the invention is illustrated in FIG. 1.

FIG. 1 shows a curve A, a curve B and a curve $B_2$.

The curve A shows a fictitious but realistic example of the noise level on a distance axis, the nearby zones being noisier than the distant zones. The curve $B_1$ shows the value, the threshold of which has to be raised according to the criteria of stationary states of the noise.

The curve $B_1$ is obtained by the smoothing of the curve A and the addition of a constant level value. It can be seen that this procedure leaves peaks of noise 1, 2, 3 which will give rise to a false alarm. The aim of the present invention is to replace the curve $B_1$ by the curve $B_2$ which, for the low levels of noise, is merged with the curve $B_1$ and moves away from it in such a way that it increases monotonically with the level of the clutter measured on the zone. The measurement of the clutter continues to be done according to one of the known methods. The aim of the invention, therefore, is to avoid the desensitizing of the radar receiver which would result from an excessive raising of the detection threshold.

An aim of the invention is also to achieve an easy adaptation of the invention to existing radars.

SUMMARY OF THE INVENTION

To all these ends, an object of the invention is a method for the adjusting of the detection threshold of a radar receiver fitted out with a module enabling the computation of the mean value as a function of the distance of the ambient noise along an axis starting from the receiver for a distance zone called a search zone surrounded by distance zones called adjacent zones wherein, for each search distance zone, the detection threshold is raised by a zero value when the ambient noise is low and by a value that increases monotonically with the level of the noise measured when the ambient noise is greater than a pre-determined threshold.

The method that has just been described corresponds to the known methods which take the spatially stationary state of the noise as their criterion. With respect to the temporally stationary state, the invention relates to a method for the adjusting of the detection threshold of a radar receiver fitted out with a rotating antenna and a computation module enabling the computation of the mean value of the ambient noise on a zone localized by its elevation angle and its distance from the radar, the zone comprising, in distance, a so-called search zone and adjacent zones, the mean value of the noise being computed iteratively from antenna rotation to antenna rotation wherein, for each search zone, the detection threshold is raised by a zero value when the ambient noise is low and by a value increasing monotonically with the measured noise level when this noise is above a pre-determined threshold.

The distance zones, whether search zones or adjacent zones, are measured in terms of distance pitch of radar considered.

When the radar is a Doppler radar, the value of the noise at each distance window is computed for each of the Doppler frequency windows at output of the Doppler filters.

The invention as described can be applied to any type of radar. The value by which the threshold is to be raised as a function of the level of the ambient noise will have to be determined by prior experiments for each type of radar. The height of the antenna above sea level is also a variable to be taken into account if one and the same type of radar is taken on board different vessels.

The value by which the threshold is raised is variable with the transmission frequency, the type of polarization, the shape of the antenna pattern, the type of sea (warm, cold, enclosed or ocean) and the state of the sea. Hence, to apply the invention properly, measurements have to be made according to geographical zone, if necessary according to season and type of radar and ship, to ascertain the level of false alarms when the detection threshold is located just above the computed mean value of noise. The constant that has appeared is that the rougher the sea is locally, the higher is the level of the signals giving rise to false alarms.

These levels could then be recorded according to geographical zone and according to the state of the sea, and then memorized.

More specifically, the invention therefore relates to a method for the continuous adjustment of the detection threshold of a radar receiver fitted out with a module enabling the computation of the mean value of the ambient noise wherein the detection threshold is raised by a value that is pre-recorded and is a function of the measured ambient noise level.

Naturally, there is nothing to prevent the ambient conditions from being characterized not only by a mean value but also by other variables, for example the standard deviation of the level of the noise with respect to the mean value measured.

BRIEF DESCRIPTION OF THE DRAWINGS

The invention is described hereinafter with reference to the appended drawings, of which.

DETAILED DESCRIPTION OF THE INVENTION

Figure 1:
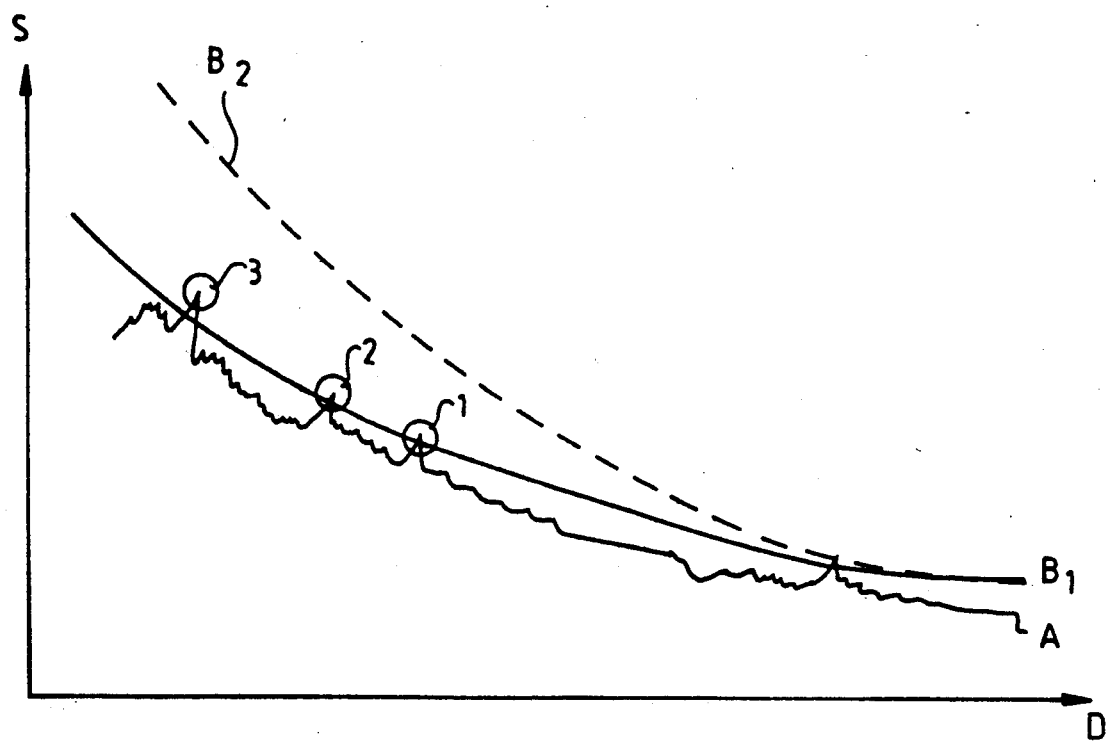
FIG. 1 shows three curves designed to illustrate the purpose and results of the invention.

FIG. 1 has already been described here above and shall not be the subject of further commentary.

A preferred embodiment shall now be described with reference to FIG. 2 which represents the mode of implementation of the method in a radar comprising several (N) methods for the regulation of false alarms, these methods being placed in parallel and grouped together by an automatic selection device.

Figure 2:
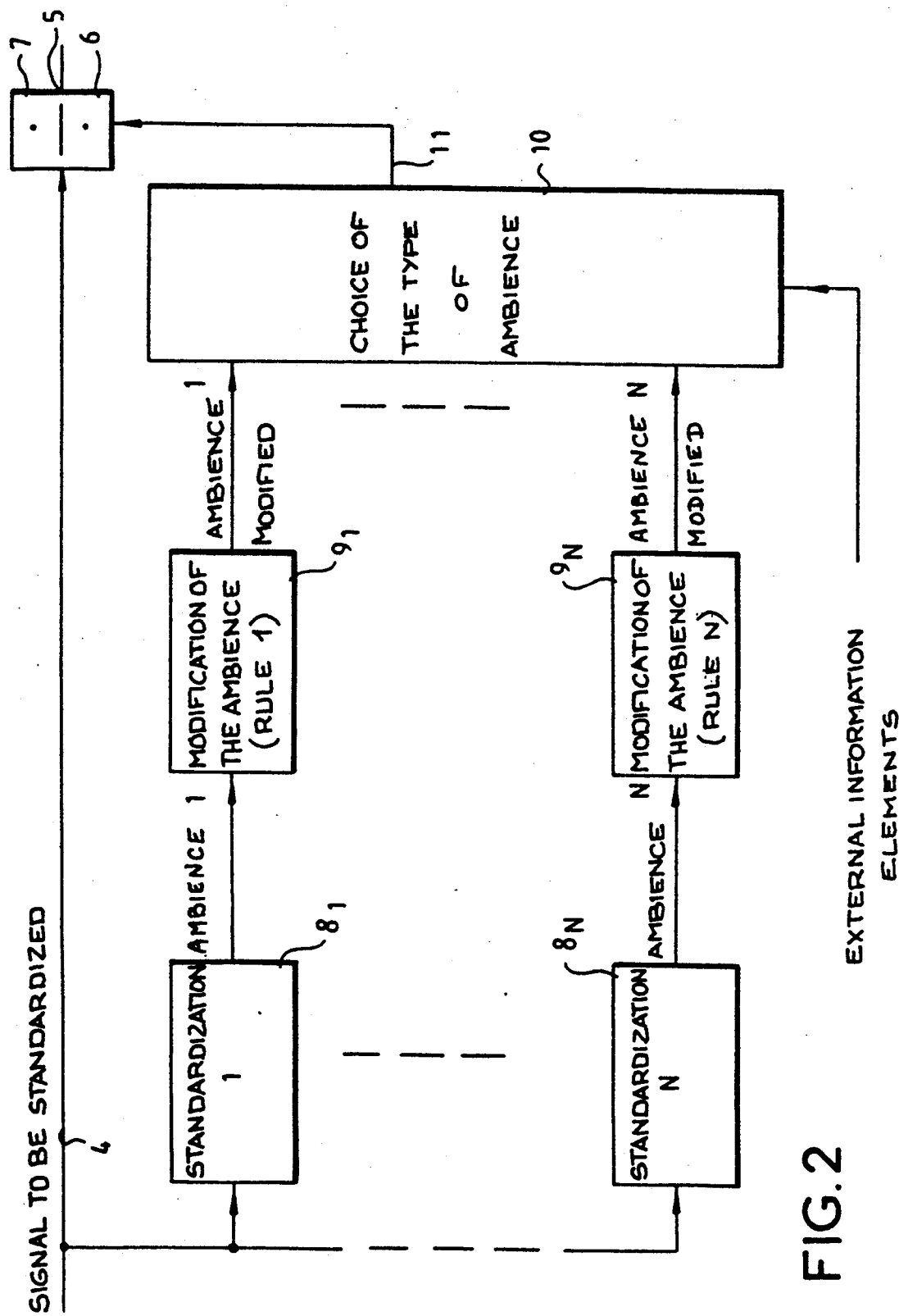
FIG. 2 is a diagram of a part of a receiver fitted out according to the invention.

FIG. 2 shows the part of a radar receiver located just before a detector. The signal processed by the elements upline with respect to the receiver arrive at 4 at a detector 5 comprising two inputs 6 and 7.

This module acts by the comparison of a detection threshold received at the input 6 with a signal level received at the input 7.

The signal arriving at 4 is sent, firstly, to the input 7 of the detector and, secondly, towards parallel-connected modules $8_1$ to $8_N$. Each of these modules carries out a computation of mean value of noise according to a computation rule or law that is known per se and has been referred to here above in the part describing the prior art.

At output of each of these modules, the ambient conditions may be characterized by a number, the mean noise level, or several numbers, mean level of noises, standard deviation etc.

The numbers at output of each of these modules 8 address memories $9_1$ to $9_n$, each of which contains, as a function of its address, a correction value to be applied to the input threshold. A module 10 selects the computation rules chosen from among the N possible rules. The module 10 receives each of the N correction values proposed and information elements coming from external devices which automatically determine the choice of the computation rule used.

The output 11 of the selection module 10 then feeds the input 6 of the detector 5 in order to set the chosen threshold value.

What is claimed is:

1. A method for the adjusting of the detection threshold of a radar receiver, fitted out with a module enabling the computation of the mean value as a function of the distance of the ambient noise along an axis starting from the receiver for a plurality of zones, wherein, for each said zone, the detection threshold is raised by a zero value when the ambient noise is low and by a value that increases monotonically with the level of the noise measured when the ambient noise is greater than a pre-determined threshold.

2. A method for the adjusting of the detection threshold of a radar receiver fitted out with a rotating antenna and a computation module enabling the computation of the mean value of the ambient noise in a plurality of zones, each zone being localized by its elevation angle and its distance from the radar, each zone comprising, in distance, a search zone and adjacent zones, the mean value of the noise being computed interatively from antenna rotation to antenna rotation wherein, for each search zone, the detection threshold is raised by a zero value when the ambient noise is low and by a value increasing monotonically with the measured noise level when this noise is above a pre-determined threshold.

3. A method according to claim 1, wherein the mean value of the noise is computed on the modulus of the signal.

4. A method according to claim 2, wherein the mean value of the noise is computed on the modulus of the signal.

5. A method according to claim 1, wherein the mean value of the noise is computed on the value of the squares of the moduli of the noise.

6. A method according to claim 2, wherein the mean value of the noise is computed on the value of the squares of the moduli of the noise.

7. A method according to claim 1, wherein the mean value of the noise is computed on the value of the logarithm of the modulus of the noise.

8. A method according to claim 2, wherein the mean value of the noise is computed on the value of the logarithm of the modulus of the noise.

9. A method according to claim 1, wherein the mean value of the noise is computed according to the method of the Kth greatest value.

10. A method according to claim 2, wherein the mean value of the noise is computed according to the method of the Kth greatest value.

11. A method according to claim 1, wherein the mean value of the noise is computed according to several distinct methods and wherein the value of the noise computed according to one of them is chosen as a function of additional criteria, the value by which the threshold is raised being determined by the ambient noise and the method of computing this noise.

12. A method according to claim 2, wherein the mean value of the noise is computed according to several distinct methods and wherein the value of the noise computed according to one of them is chosen as a function of additional criteria, the value by which the threshold is raised being determined by the ambient noise and the method of computing this noise.

13. A method according to claim 3, wherein the mean value of the noise is computed on the zones adjacent to the search zone in excluding the search zone.

* * * * *